(12) United States Patent
Pamperin et al.

(10) Patent No.: US 10,987,811 B2
(45) Date of Patent: Apr. 27, 2021

(54) METHOD AND SYSTEM FOR WRAPPING TIES IN A FACEMASK MANUFACTURING PROCESS

(71) Applicant: O&M Halyard, Inc., Mechanicsville, VA (US)

(72) Inventors: Mark T. Pamperin, Cumming, GA (US); Joseph P. Weber, Suwanee, GA (US); Eric C. Steindorf, Roswell, GA (US); Anthony S. Spencer, Woodstock, GA (US)

(73) Assignee: O&M Halyard, Inc., Mechanicsville, VA (US)

( * ) Notice: Subject to any disclaimer, the term of this patent is extended or adjusted under 35 U.S.C. 154(b) by 0 days.

(21) Appl. No.: 16/484,640

(22) PCT Filed: Aug. 16, 2017

(86) PCT No.: PCT/US2017/047058
§ 371 (c)(1),
(2) Date: Aug. 8, 2019

(87) PCT Pub. No.: WO2019/035820
PCT Pub. Date: Feb. 21, 2019

(65) Prior Publication Data
US 2020/0385157 A1    Dec. 10, 2020

(51) Int. Cl.
*B25J 9/00* (2006.01)
*B25J 9/16* (2006.01)
(Continued)

(52) U.S. Cl.
CPC ......... *B25J 9/1679* (2013.01); *A41D 13/1115* (2013.01); *A41D 13/1161* (2013.01);
(Continued)

(58) Field of Classification Search
CPC ..... A41D 13/1161; B25J 9/0093; B65B 63/04
(Continued)

(56) References Cited

U.S. PATENT DOCUMENTS

| 4,517,785 A | 5/1985 | Masuda |
| 5,108,017 A * | 4/1992 | Adamski, Jr. .......... A41H 43/02 |
| | | 223/37 |

(Continued)

FOREIGN PATENT DOCUMENTS

| CH | 499446 A | 11/1970 |
| CN | 106938799 A | 7/2017 |

(Continued)

OTHER PUBLICATIONS

International Search Report and Written Opinion for PCT/US2017/047058, dated Oct. 25, 2018, 10 pages.

*Primary Examiner* — Thomas Randazzo
(74) *Attorney, Agent, or Firm* — Dority & Manning, P.A.

(57) ABSTRACT

An automated system and method wrap the fastening ties around the body of a continuous stream of facemasks in a facemask production line. The facemasks are oriented such that each facemask has a leading pair of ties and a trailing pair of ties extending from a body in a conveying direction of the production line. At a wrapping station in the production line, the body is subsequently clamped with a clamping device of an automated robotic arm. The robotic arm is driven in the conveying direction while rotating the clamping device and body relative to a rotation axis through the body to cause the leading and trailing pairs of ties to wrap around the body. The robotic arm then deposits the facemask with wrapped ties onto the conveyor.

14 Claims, 6 Drawing Sheets

(51) Int. Cl.
  *B25J 5/02* (2006.01)
  *B65B 63/04* (2006.01)
  *A41D 13/11* (2006.01)
  *A41H 42/00* (2006.01)
  *A41H 43/02* (2006.01)
  *B65B 35/18* (2006.01)
  *B65G 47/52* (2006.01)
  *B65G 47/90* (2006.01)
  *B65B 35/24* (2006.01)

(52) U.S. Cl.
  CPC ............. *A41H 42/00* (2013.01); *A41H 43/02* (2013.01); *B25J 5/02* (2013.01); *B25J 9/0093* (2013.01); *B25J 9/1664* (2013.01); *B25J 9/1669* (2013.01); *B65B 35/18* (2013.01); *B65B 63/04* (2013.01); *B65G 47/525* (2013.01); *B65G 47/902* (2013.01); *B65B 35/24* (2013.01); *G05B 2219/39102* (2013.01); *Y10S 901/09* (2013.01)

(58) Field of Classification Search
  USPC .......................................................... 700/250
  See application file for complete search history.

(56) References Cited

U.S. PATENT DOCUMENTS

| | | | |
|---|---|---|---|
| 5,503,515 | A | 4/1996 | Moorehead |
| 6,158,198 | A | 12/2000 | Faircloth et al. |
| 6,305,146 | B1 | 10/2001 | Gerber |
| 2006/0137691 | A1 | 6/2006 | Kleman et al. |
| 2006/0283454 | A1 | 12/2006 | Delaney et al. |
| 2015/0259087 | A1 | 9/2015 | Schwartz et al. |
| 2018/0333849 | A1* | 11/2018 | Sugio .................... B25J 9/1664 |
| 2019/0210755 | A1* | 7/2019 | Spencer ................. B65B 63/04 |
| 2020/0165023 | A1* | 5/2020 | Pamperin ............... B65B 25/20 |
| 2020/0172274 | A1* | 6/2020 | Pamperin ............... B65B 63/04 |
| 2020/0385156 | A1* | 12/2020 | Steindorf ............... B65B 63/04 |

FOREIGN PATENT DOCUMENTS

| | | |
|---|---|---|
| EP | 0 773 177 A2 | 5/1997 |
| EP | 1 464 579 A2 | 10/2004 |
| FR | 2313085 A2 | 12/1976 |
| FR | 2313269 A1 | 12/1976 |
| GB | 2 271 096 A | 4/1994 |
| GB | 2474725 A | 4/2011 |
| NL | 1020526 C1 | 11/2003 |
| WO | WO 2013/015731 A1 | 1/2013 |

\* cited by examiner

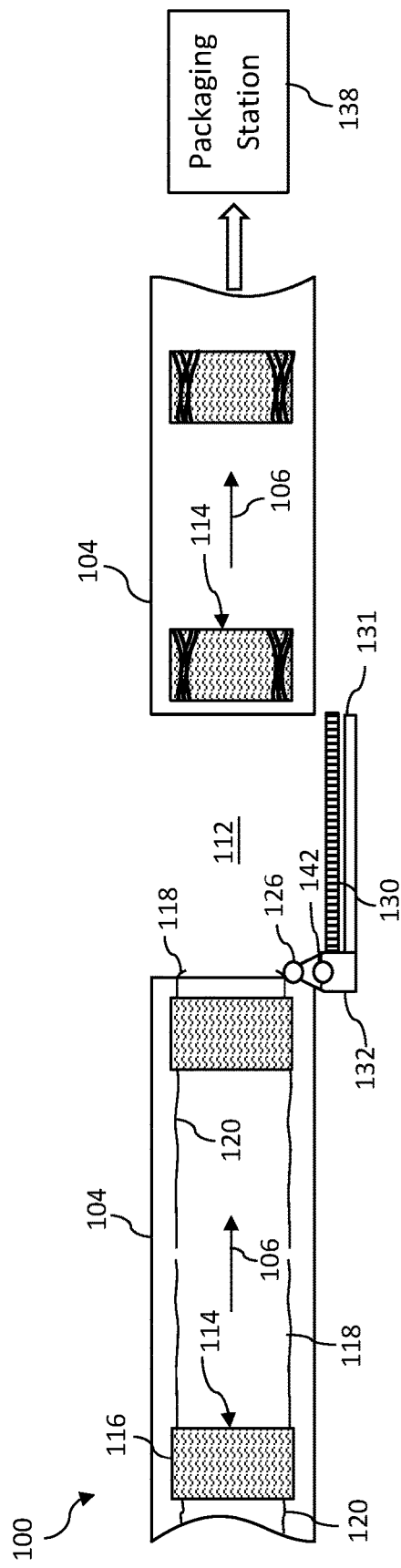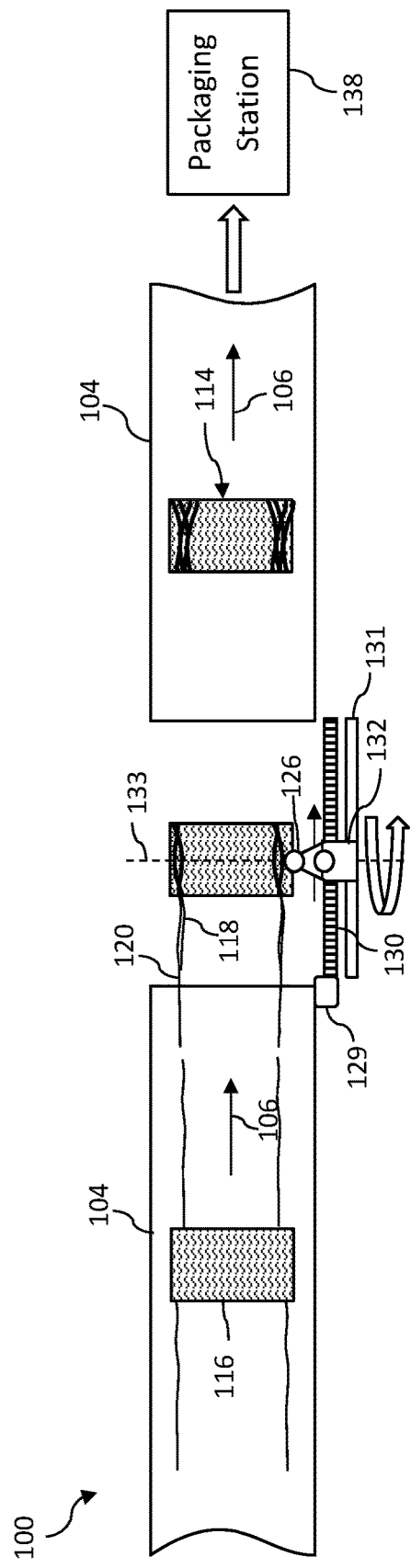

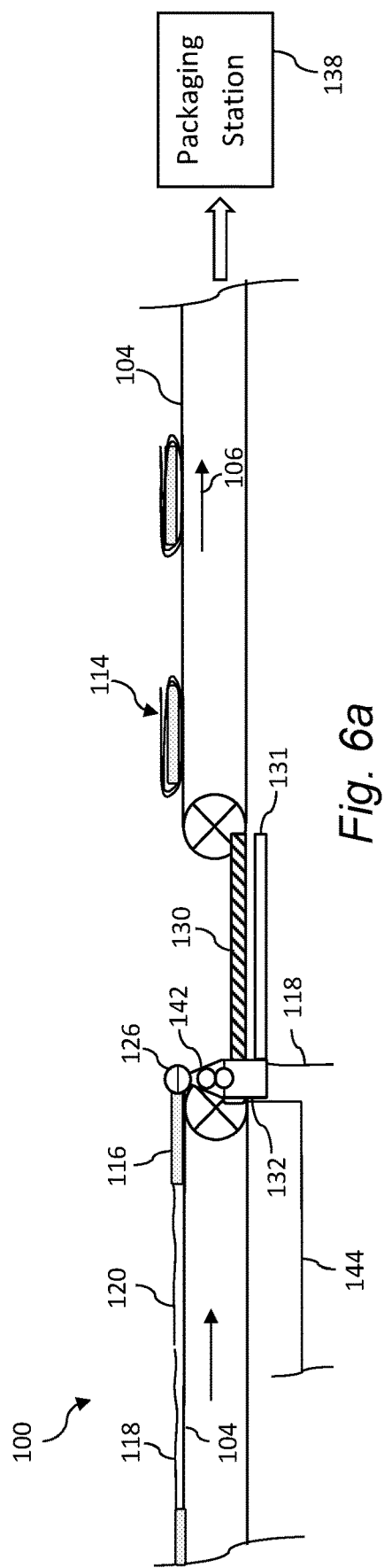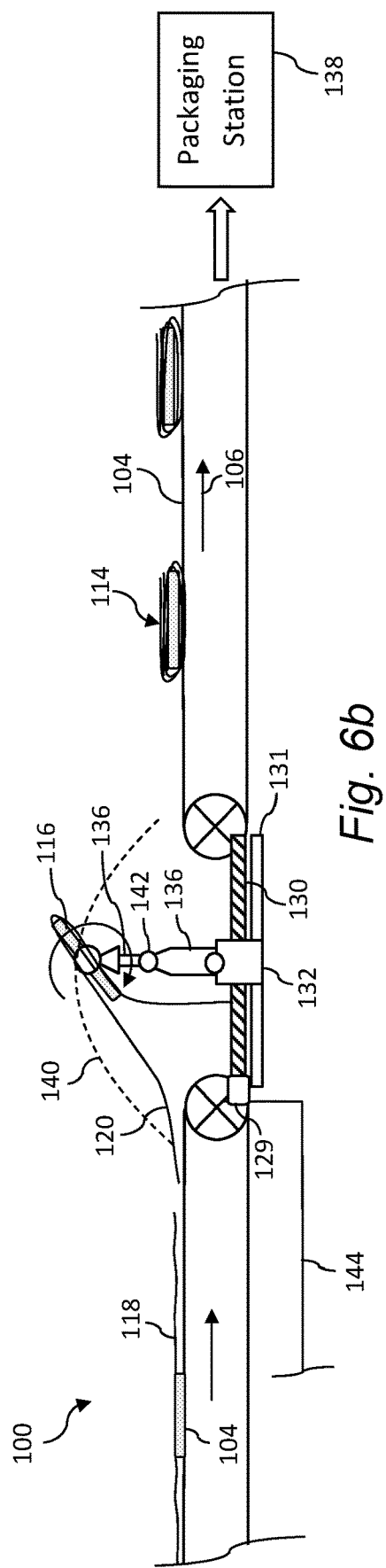

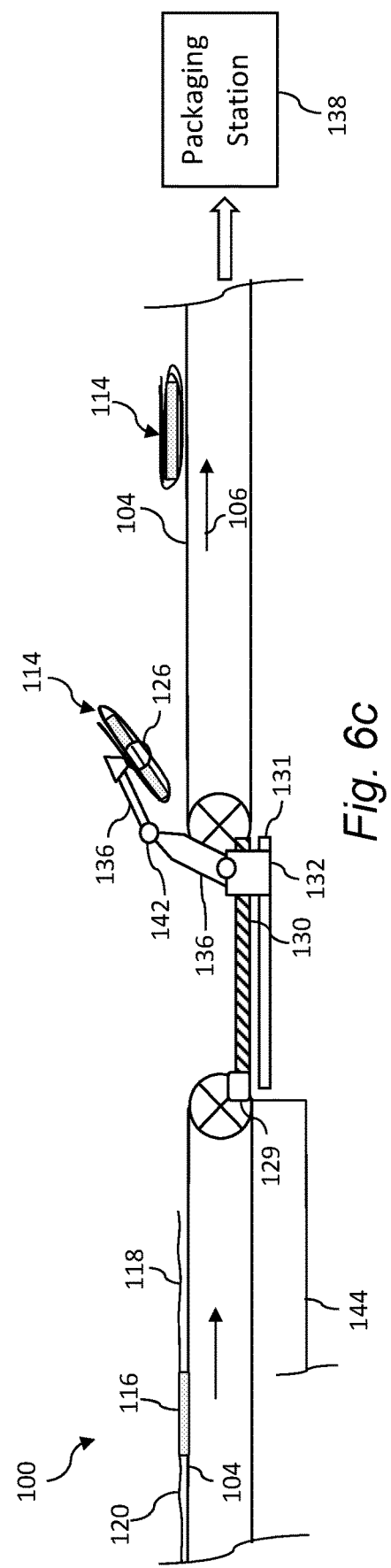

METHOD AND SYSTEM FOR WRAPPING TIES IN A FACEMASK MANUFACTURING PROCESS

PRIORITY INFORMATION

The present application is the national stage entry of International Patent Application No. PCT/US2017/047058, filed Aug. 16, 2017, the contents of which are incorporated herein by reference thereto.

FAMILY OF RELATED APPLICATIONS

The present application is related by subject matter to the following concurrently filed PCT applications (all of which designate the US):

a. International Application No.: PCT/US2017/047051; entitled "Method and System for Wrapping Ties in a Facemask Manufacturing Process".

b. International Application No.: PCT/US2017/047053; entitled "Method and System for Wrapping Ties in a Facemask Manufacturing Process".

c. International Application No.: PCT/US2017/047054; entitled "Method and System for Wrapping Ties in a Facemask Manufacturing Process".

d. International Application No.: PCT/US2017/047055; entitled "Method and System for Wrapping Ties in a Facemask Manufacturing Process".

e. International Application No.: PCT/US2017/047057; entitled "Method and System for Wrapping Ties in a Facemask Manufacturing Process".

The above cited applications are incorporated herein by reference for all purposes. Any combination of the features and aspects of the subject matter described in the cited applications may be combined with embodiments of the present application to yield still further embodiments of the present invention.

FIELD OF THE INVENTION

The present invention relates generally to the field of protective facemasks, such as surgical facemasks, and more specifically to a method and system for wrapping the head fastening ties attached to each facemask in the manufacturing line of such facemasks.

BACKGROUND OF THE INVENTION

Various configurations of disposable filtering facemasks or respirators are known and may be referred to by various names, including "facemasks", "respirators", "filtering face respirators", "surgical facemasks", and so forth. For purposes of this disclosure, such devices are referred to herein generically as "facemasks."

The ability to supply aid workers, rescue personnel, and the general populace with protective facemasks during times of natural disasters or other catastrophic events is crucial. For example, in the event of a pandemic, the use of facemasks that offer filtered breathing is a key aspect of the response and recovery to such event. For this reason, governments and other municipalities generally maintain a ready stockpile of the facemasks for immediate emergency use. However, the facemasks have a defined shelf life, and the stockpile must be continuously monitored for expiration and replenishing. This is an extremely expensive undertaking.

Recently, investigation has been initiated into whether or not it would be feasible to mass produce facemasks on an "as needed" basis during pandemics or other disasters instead of relying on stockpiles. For example, in 2013, the Biomedical Advanced Research and Development Authority (BARDA) within the Office of the Assistant Secretary for Preparedness and Response in the U.S. Department of Health and Human Services estimated that up to 100 million facemasks would be needed during a pandemic situation in the U.S., and proposed research into whether this demand could be met by mass production of from 1.5 to 2 million facemasks per day to avoid stockpiling. This translates to about 1,500 masks/minute. Current facemask production lines are capable of producing only about 100 masks/minute due to technology and equipment restraints, which falls far short of the estimated goal. Accordingly, advancements in the manufacturing and production processes will be needed if the goal of "on demand" facemasks during a pandemic is to become a reality.

Certain configurations of pleated facemasks include head fastening ties bonded to the top and bottom edges of a rectangular body. For example, a conventional surgical facemask may have a 3.75 inch×7 inch pleated rectangular body centered on 32 inch ties bonded along the top and bottom edges (long sides) of the body. In the machine direction of the manufacturing line, these ties define a leading set of ties and a trailing set of ties. Prior to conveying the individual facemasks to a packaging station, it is generally desired to wrap the ties around the body of the facemask. However, the current manual and automated methods for wrapping the ties is relatively slow. For mass production of facemasks at the throughputs mentioned above, it will be necessary to wrap the ties around the facemask body while maintaining the high production speeds of the running line.

The present invention addresses this need and provides a method and related system for high speed wrapping of head fastening ties around the facemask body in a facemask production line.

SUMMARY OF THE INVENTION

Objects and advantages of the invention will be set forth in the following description, or may be obvious from the description, or may be learned through practice of the invention.

In accordance with aspects of the invention, an automated method is provided for wrapping fastening ties around a body of a continuous stream of facemasks in a facemask production line. The method includes conveying the facemasks on any manner of conventional conveyor in the production line at an orientation such that each facemask has a leading pair of ties and a trailing pair of ties extending from a body in a conveying direction of the production line. At a wrapping station in the production line, the facemask body is subsequently clamped with a clamping device configured at an end of an automated robotic arm. This robotic arm is driven in the conveying direction while simultaneously rotating the clamping device and body relative to a rotation axis through the body to cause the leading and trailing pairs of ties to wrap around the body. At the end of its travel path, the robotic arm deposits the facemask onto the conveyor subsequent to wrapping the leading and trailing pairs of ties around the body.

In a particular embodiment, the method includes drawing the leading pair of ties below the body as the facemask continues to be conveyed in the conveying direction such that the leading pair of ties wraps (e.g. folds) under the body prior to or during clamping of the body with the clamping device on the end of the robotic arm. This function may be accomplished by a suction device disposed in a gap between a first section of the conveyor and a second section of the conveyor, wherein the body is transferred from the first section of the conveyor to the robotic arm and deposited by the robotic arm onto the second section of the conveyor after the leading and trailing pairs of ties have been wrapped around the body.

The robotic arm may be configured in various ways with a plurality of articulated sections that are controlled for the robotic arm to lower to the conveyor at the start position, clamp the body with the clamping device, raise the body above the conveyor, travel in the conveying direction while rotating the clamping device, and lower the facemask back to the conveyor. Each of the sections of the robotic arm, including the clamping device, may be controlled by a respective servomotor, wherein the servomotors are in communication with and controlled by a robotic arm controller.

In a particular embodiment, the robotic arm is conveyed in the conveying direction along a track. For example, the robotic arm may be driven along the track by a motor and threaded axle that is engaged with a gear in the robotic arm. The motor turns the axle in a first direction to drive the robotic arm in the conveying direction, and turns the axle in the opposite direction to return the robotic arm to the start position.

In a particular embodiment, the robotic arm moves the body in an arc path from the start position of the robotic arm relative to the conveyor to the stop position, wherein the arc length is sufficient to allow the desired number of wrappings of the ties around the facemask body prior to depositing the facemask back onto the conveyor.

Actuation of the robotic arm may be controlled by, for example, a sensor disposed to detect the leading edge of the facemask body just before the body reaches the arm or gap in the conveyor where the arm is configured. Timing may also be preset based on the spacing and conveying speed of the facemasks.

In addition to improving the dispensing process and enabling easier donning of the facemasks, the individually wrapped masks provides for a more compact dispenser box. When the ties are not individually wrapped, the dispenser box and case need to be significantly larger to accommodate the mass of ties.

The present invention also encompasses various system embodiments for wrapping the fastening ties around the body of a facemask in an automated production line in accordance with the present methods, as described and supported herein.

Other features and aspects of the present invention are discussed in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which:

FIGS. 5a and 5b are top sequential diagram views depicting wrapping of the leading and trailing ties around the facemask body with an embodiment in accordance with the invention; and FIGS. 6a through 6c are side sequential diagram views depicting wrapping of the leading and trailing ties around the facemask body with an embodiment in accordance with the invention.

DETAILED DESCRIPTION OF
REPRESENTATIVE EMBODIMENTS

Reference now will be made in detail to various embodiments of the invention, one or more examples of which are set forth below. Each example is provided by way of explanation of the invention, not limitation of the invention. In fact, it will be apparent to those skilled in the art that various modifications and variations may be made in the present invention without departing from the scope or spirit of the invention. For instance, features illustrated or described as part of one embodiment, may be used on another embodiment to yield a still further embodiment. Thus, it is intended that the present invention covers such modifications and variations as come within the scope of the appended claims and their equivalents.

As mentioned, the present methods and systems relate to wrapping the fastening ties around the body of a facemask in an automated method that supports a high throughput of facemasks in a production line. The upstream and downstream facemask production steps are not limiting aspects of the invention and, thus, will not be explained in great detail herein.

Also, the present disclosure refers to or implies conveyance or transport of certain components of the facemasks through the production line. It should be readily appreciated that any manner and combination of article conveyors (e.g., rotary and linear conveyors), article placers (e.g. vacuum puck placers), and transfer devices are well known in the article conveying industry and can be used for the purposes described herein. It is not necessary for an understanding and appreciation of the present methods to provide a detailed explanation of these well-known devices and system.

Various styles and configurations of facemasks that incorporate pairs of head fastening ties are well known, including flat pleated facemasks and pouch (e.g. "duckbill" facemasks, both of which are described briefly below. The present invention has utility in the production lines for these conventional masks, as well as any other type of facemask wherein it is beneficial to wrap the head fastening ties around the body of the facemask for subsequent packaging, dispensing, donning, or any other reasons. For illustrative purposes only, aspects of the present method are described herein with reference to a particular type of flat pleated facemask, as illustrated in FIG. 1.

Figure 1:
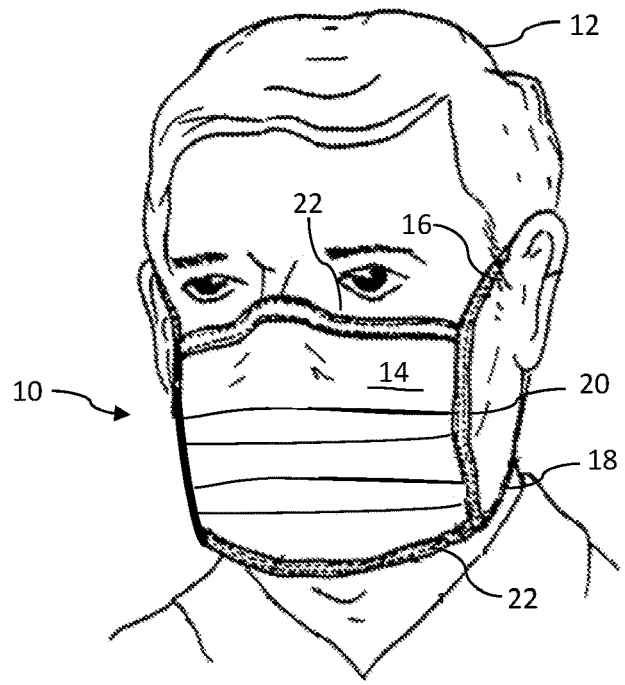
FIG. 1 is a perspective view of a conventional facemask worn by a user, the facemask incorporating upper and lower head fastening ties.

Referring to FIG. 1, a representative flat pleated facemask 10 is illustrated on the face of wearer 12. The mask 10 includes filter body 14 that is secured to the wearer 12 by means of a pair of upper ties straps 16 and a pair of lower tie straps 18. These tie straps may be defined by a continuous strip that is attached by known conventional means along the side edges 20 of the body 14. In alternate embodiments, the pairs of tie straps 16, 18 may be attached along the top and bottom edges 22 of the body, or may be defined by individual members attached to the corners of the body 14.

Figure 2:
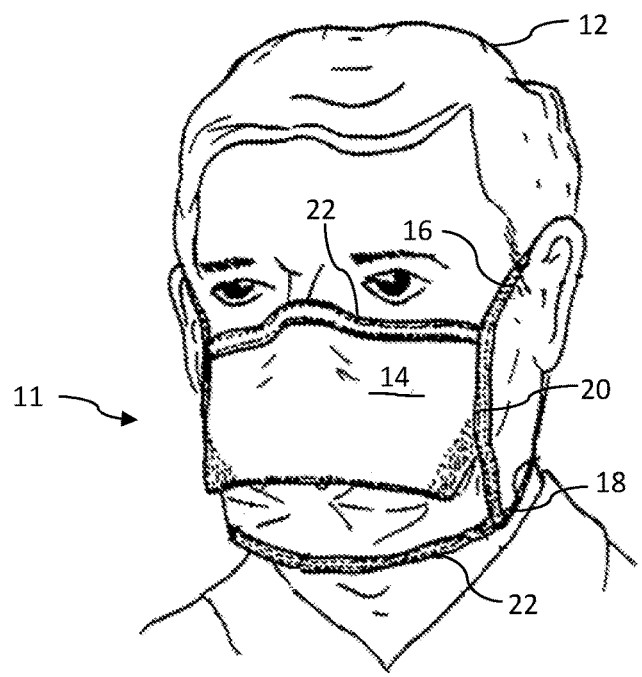
FIG. 2 is a perspective view of another conventional facemask worn by a user, the facemask incorporating upper and lower head fastening ties.

FIG. 2 depicts a duckbill style facemask 11 that has the general shape of a cup or cone when placed on the face of wearer 12 and thus provides "off-the-face" benefits of a molded-cone style mask while still being easy for wearer 12 to carry mask 11 in a pocket prior to use. "Off-the-face" style masks provide a larger breathing chamber as compared to soft, pleated masks which contact a substantial portion of the wearer's face. Therefore, "off-the-face" masks permit cooler and easier breathing. With this style, the pairs of tie straps 16, 18 may be attached as described above with respect to the facemask 10 of FIG. 1.

Figure 3A:
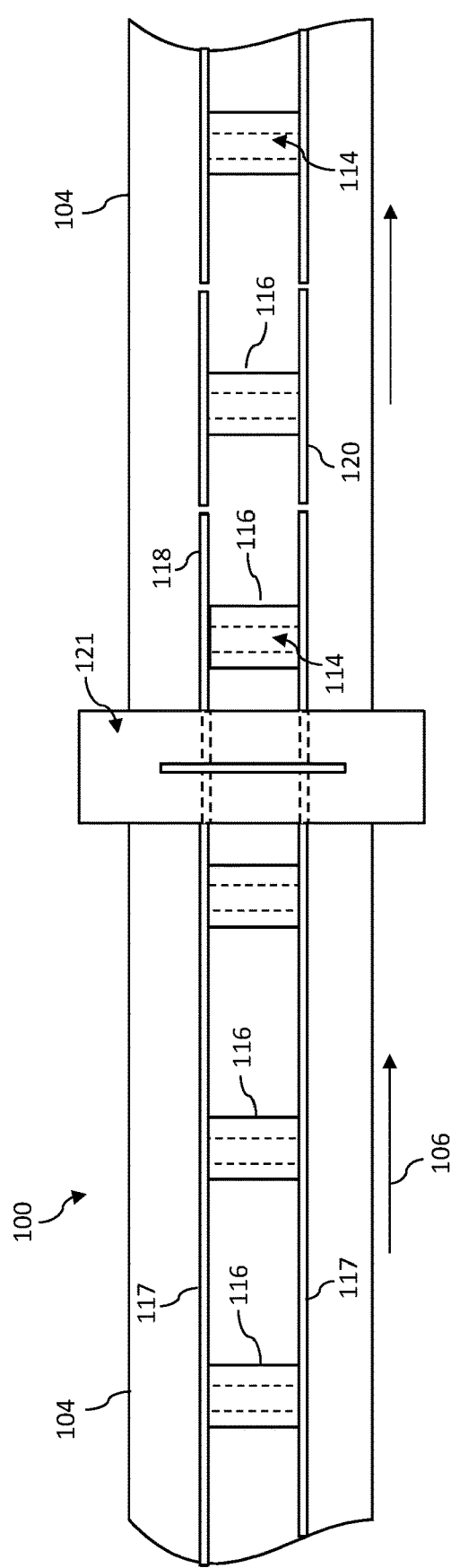
FIGS. 3a and 3b are top diagram views of portions of facemask production line incorporating aspects of the invention for cutting and wrapping leading and trailing ties around the body of the facemasks.

FIG. 3a depicts a portion of a facemask production line 100 wherein a plurality of facemask bodies 116 are moved on a conveyor 104 in a conveying direction 106. The bodies 116 are connected by a continuous tie strip 117 along each of the opposite sides of the bodies 116. This continuous tie strip 117 is applied to the sides of the bodies 116 in an upstream process. The strips 117 and bodies 116 are conveyed through a cutting station 121 wherein a blade or other cutting device severs the continuous ties strips 117 intermediate of the bodies 116. In this manner, each facemask 114 then includes a body 116 with a pair of leading ties 118 and a pair of trailing ties 120 relative to the conveying 106 of the facemasks 114. The length of the individual ties 118, 120 is a function of the spacing between the bodies 116 upstream of the cutting station 121.

Figure 3B:
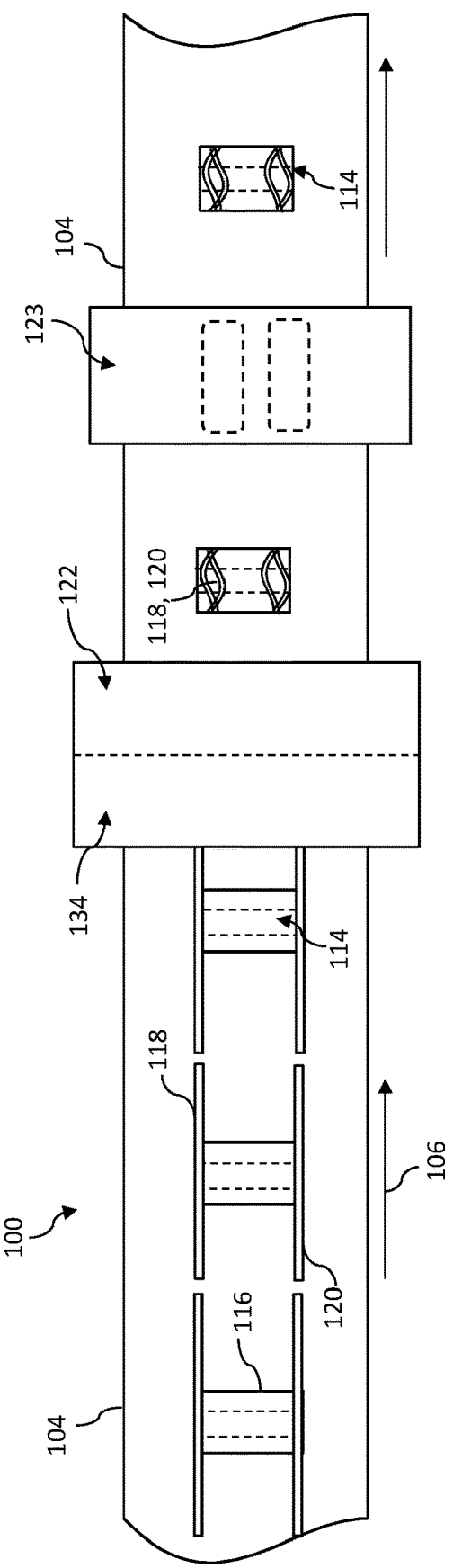

FIG. 3b depicts the facemasks 114 on the conveyor 104 downstream of the cutting station 121 of FIG. 3a. The individual facemasks 114, including the body 116 with leading ties 118 and trailing ties 120, are continuously conveyed in the conveying direction 106 to an automated wrapping station 122, as described in greater detail below. The facemasks 114 emerge from the wrapping station 122 with the pairs of leading 118 and pairs of trailing 120 ties wrapped one or more times around the body 116 adjacent to the sides of the body 116. From here, the facemasks 114 can be conveyed to a downstream packaging station 138 (FIGS. 5a-5c).

In an alternate conventional pleated facemask 114 embodiment, the tie straps 118, 120 are attached along the upper (nose) and lower (chin) edges of the facemask body 116, and thus have an initial horizontal orientation relative to the longer aspect of the body 116. The present method and system for wrapping the ties are applicable to these types of facemasks 114 as well. With this type of facemasks 114, the ties may be initially turned or oriented before the facemasks 114 reach the wrapping station 122 so that the ties have the same orientation relative to the body as the facemasks 114 and ties 118, 120 depicted in FIG. 3b. Alternatively, the ties 118, 120 need not be reoriented, but could be wrapped around the longer aspect of the body 116. It should thus be appreciated that the present methods and systems are not limited to any particular style or attachment of the ties 118, 120 relative to the facemask body 116.

FIG. 3b also depicts a setting station 123 downstream of the wrapping station 122 for the purpose of setting the folds in the wrapped ties 118, 120 to ensure that the ties do not prematurely unravel/unwrap during packaging and when removing and donning the facemasks 114. This may be done, for example, by passing the facemask 114 with wrapped ties between compression rollers or the nip of a compression conveyor configuration that induce creases or crimps in the folded ties 118, 120.

FIG. 3b also indicates an optional means 134 either at the wrapping station 122 or upstream of the wrapping station for initially drawing the pair of leading ties 118 below the facemask body 116 as the facemasks 114 continued to be conveyed in the conveying direction 106. This function is not required in all embodiments of the invention, and is described more fully below.

Figure 4A:
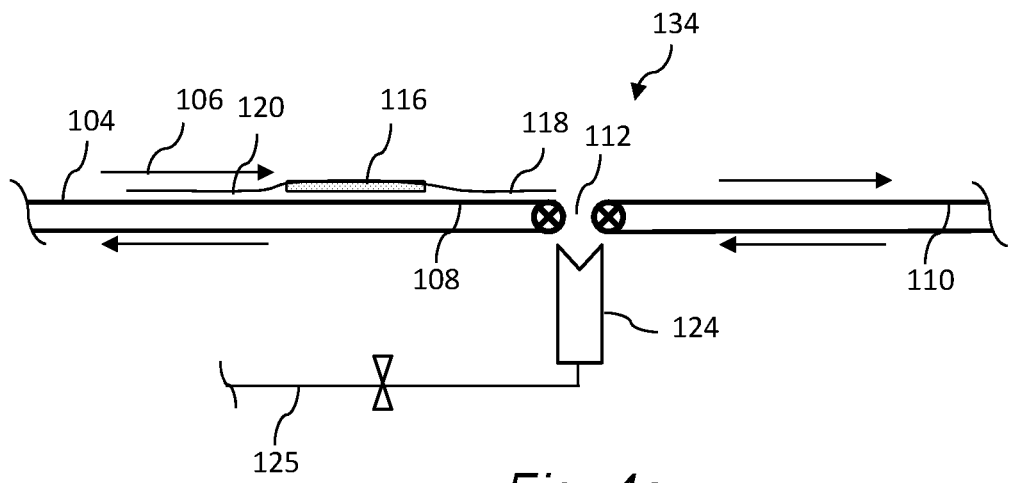
FIGS. 4a through 4c are sequential diagram views of the leading ties being drawn under the body of the facemask as the facemask continues to move in a conveying direction through the production line.
Figure 4B:
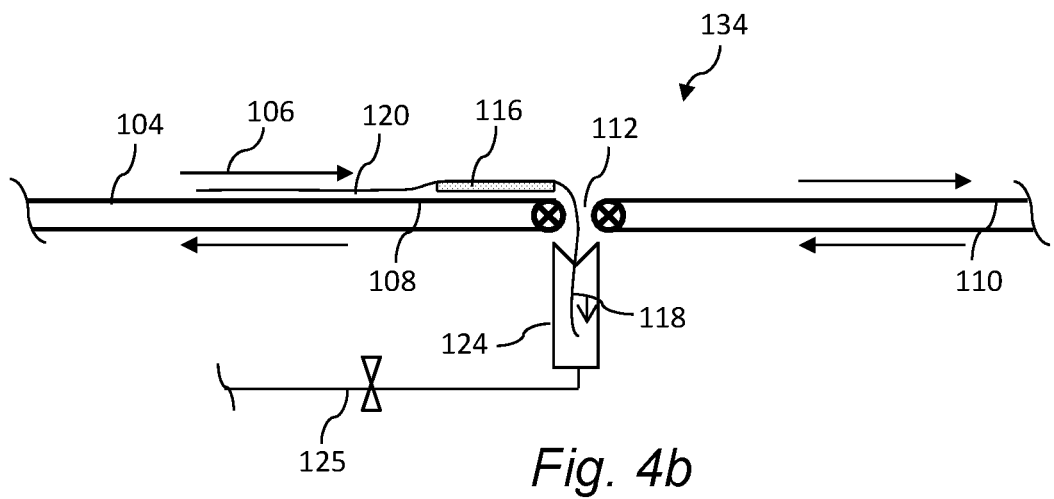
Figure 4C:
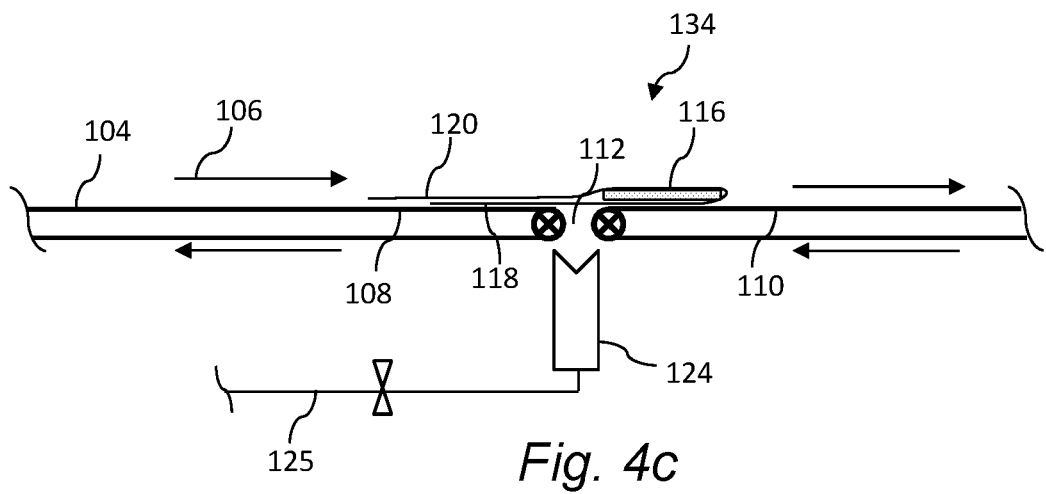

FIGS. 4a through 4c depict an embodiment of the means 134 for initially drawing the pair of leading ties 118 below the facemask body 116 as the facemasks 114 continued to be conveyed in the conveying direction 106. The conveyor 104 includes a first section 108 and a second section 110, with a gap 112 defined between the sections 108, 110. A suction device 124 is disposed below the conveying plane of the conveyor 104 in the gap 112. A vacuum is drawn in the suction device 124 via a control/suction line 125. As depicted in the sequential figures, as the pair of leading ties 118 approaches the gap 112, they are drawn down into the suction device 124 as the body 116 continues to move across the gap 112 and onto the second section 110 of the conveyor 104. As the body 116 continues to move in the conveying direction 106, the pair of leading ties 118 are drawn out of the suction device 124 and are thus folded (partially wrapped) under the body 116, as depicted in FIG. 4c. The suction device 124 may be controlled to drawn a generally continuous vacuum that is sufficient for drawing in the leading ties 118, yet allows for the ties 118 to be subsequently withdrawn as the body continues to move across the gap 112. In an alternate embodiment, the suction device may be controlled to only apply an intermittent vacuum to initially draw-in the leading ties 118, wherein the vacuum is released as the body 116 moves across the gap 112.

If the means 134 depicted in FIGS. 4a through 4c are used to fold the leading ties 118 under the body 116 prior to further wrapping of the ties 118, 120, then the facemasks 114 with the pair of leading ties 118 folded under their body 116 are then conveyed to the wrapping station 122 via the second conveyor section 110 wherein the body 116 is rotated relative to a rotation axis 133 through the body 116 to cause the leading 118 and trailing 129 pairs of ties to further wrap around the body 116, as described more fully below.

It should be appreciated that the means 134 for drawing the pair of leading ties 118 below the body 116 is not limited to the embodiment described above. An alternate embodiment may rely solely on gravity, wherein the pair of leading ties 118 drop into the gap 112. In an alternate embodiment, a mechanical device, such as a mechanical gripper or friction roller may be provided in the gap to engage the ties 118 as they drop into the gap 112.

At the wrapping station 122, the body 116 is rotated as described below relative to a rotation axis 133 through the body 116 to cause the leading 118 and trailing 120 pairs of ties to further wrap around the body 116. This rotational aspect of the method induces a partial or multiple wrappings of the ties 118, 120 depending on the length of the ties and the desired number of wraps.

Referring to FIGS. 5a-5b and 6a-6c, a method and system 100 embodiment of the wrapping process at the wrapping station 122 (FIG. 3b) implemented with an automated robotic arm 132 is depicted. The facemasks 114 are conveyed on conveyor 104 in the conveying direction 106 with the leading pair of ties 118 and trailing pair of ties 120 oriented as depicted in the figure. With this embodiment, the leading pair of ties 118 has not been previously folded under the body 116. A gap 112 is defined in the conveyor 104, and the leading ties 118 will drop into (or be sucked into via a suction device 124 as in FIGS. 4a-4c) the gap 112 as the body 116 is conveyed to the robotic arm 132. In this manner, the leading pair of ties 18 are partially folded or wrapped under the body 116 upon initial grasping and rotation of the clamping device 126.

In the depicted embodiment, the robotic arm 132 is configured by a plurality of articulating sections 136 that articulate relative to adjacent respective sections via single axis or universal joints 142. The number of sections 136 and joints 142 can vary within the scope and spirit of the invention depending on various factors, such as the desired range of motion of the robotic arm 132, the changes in height of the working path of the robotic arm 132, location of the robotic arm 132 with respect to the conveyor 104, and so forth.

In FIGS. 5a and 6a, the robotic arm is in an initial start position in the gap 112, with a clamping device 126 is configured at an end of the robotic arm 132. As the facemask body 116 is driven into the gap 112, it is grasped by the clamping device 126 generally near the middle of the body 116. The clamping point defines a rotational axis 133 of the body 116.

Generally simultaneously with the clamping function, the robotic arm 132 is driven in the conveying direction 106 alongside the conveyor 104 within the gap 112. Simultaneously, the clamping device 126 rotates relative to the axis 133, thereby causing the leading 118 and trailing 120 pairs of ties to wrap around the body 116, as depicted in FIGS. 5b and 6b. At the end of its travel path, the robotic arm 132 deposits the facemask 114 onto the conveyor 104 subsequent to wrapping the leading 118 and trailing 120 pairs of ties around the body 116 the desired number of wraps, as depicted in FIG. 6c.

As mentioned, the robotic arm 132 may be configured in various ways with a plurality of the articulated sections 136 that are controlled by a suitable machine controller (not depicted in the drawings) for the robotic arm 132 to: lower to the conveyor 104 at the start position; clamp the body 116 with the clamping device 126; raise the body 116 above the conveyor 104; travel in the conveying direction 106 while rotating the clamping device 126, and lower the facemask 114 with wrapped ties 118, 120 back onto the conveyor 104. Each of the articulating sections 136, including the clamping device 126, may be controlled by a respective servomotor, wherein the servomotors are in communication with and controlled by the robotic arm controller.

In the illustrated embodiment, the robotic arm 132 is conveyed in the conveying direction 106 along a track 131 disposed in the gap 112. For example, the robotic arm 132 may be driven along the track 131 by a motor 129 controlled via control line 144 that rotates a threaded axle 130. The robotic arm 132 includes a gear in the base thereof that is engaged with the threaded axle 130. Thus, the motor 129 turns the axle 130 in a first direction to drive the robotic arm 132 in the conveying direction 106, and turns the axle 130 in the opposite direction to return the robotic arm 132 to the start position.

As depicted in FIG. 6b, the robotic arm 132 (including the clamping device 126) moves the body 116 in an arc path 140 from the start position of FIG. 6a to the final or stop position of FIG. 6c, wherein the arc 140 has sufficient height and length to allow the desired number of wrappings of the ties 118, 120 around the facemask body 116 prior to depositing the facemask 114 back onto the conveyor 104.

Actuation of the robotic arm 132 may be controlled by, for example, a sensor disposed to detect the leading edge of the facemask body 116 just before the body 116 reaches the arm 132 or gap 112 in the conveyor 104 where the arm 132 is configured. Actuation may also be preset based on the spacing and conveying speed of the facemasks 114 on the conveyor 104.

The material particularly shown and described above is not meant to be limiting, but instead serves to show and teach various exemplary implementations of the present subject matter. As set forth in the attached claims, the scope of the present invention includes both combinations and sub-combinations of various features discussed herein, along with such variations and modifications as would occur to a person of skill in the art.

What is claimed is:

1. An automated method for wrapping fastening ties around a body of a continuous stream of facemasks in a facemask production line, comprising:
   conveying the facemasks on a conveyor in the production line at an orientation such that each facemask has a leading pair of ties and a trailing pair of ties extending from a body in a conveying direction of the production line;
   at a wrapping station in the production line, subsequently clamping the body with a clamping device of an automated robotic arm;
   conveying the robotic arm in the conveying direction while rotating the clamping device and body relative to a rotation axis through the body to cause the leading and trailing pairs of ties to wrap around the body; and
   depositing the facemask onto the conveyor subsequent to wrapping the leading and trailing pairs of ties around the body.

2. The automated method of claim 1, wherein the robotic arm has a plurality of articulated sections configured for the robotic arm to lower to the conveyor, clamp the body with the clamping device, raise the body above the conveyor, travel in the conveying direction while rotating the clamping device, and lower the facemask back to the conveyor.

3. The automated method of claim 1, wherein the robotic arm moves the body in an arc path from a start position of the robotic arm relative to the conveyor to a stop position where the facemask is deposited back onto the conveyor.

4. The automated method of claim 1, further comprising drawing the leading pair of ties below the body as the facemask is conveyed in the conveying direction such that the leading pair of ties wraps under the body prior to clamping the body with the clamping device.

5. The automated method of claim 4, wherein the leading pair of ties are drawn below the body by a suction device disposed in a gap between a first section of the conveyor and a second section of the conveyor, the body transferred from the first section of the conveyor to the robotic arm and deposited by the robotic arm onto the second section of the conveyor after the leading and trailing pairs of ties have been wrapped around the body.

6. The automated method of claim 1, wherein the robotic arm is conveyed in the conveying direction along a track.

7. The automated method of claim 6, wherein the robotic arm is driven along the track by a motor and threaded axle engaged with the robotic arm, the motor being reversible to return the robotic arm to a start position.

8. An automated production line system for wrapping fastening ties around a body of a continuous stream of facemasks conveyed through the production line, comprising:
   a conveyor on which the facemasks are conveyed at an orientation such that each facemask has a leading pair of ties and a trailing pair of ties extending from a body in a conveying direction of the production line;

a wrapping station in the production line; and at the wrapping station, an automated robotic arm with a clamping device at an end thereof, the robotic arm drivable in the conveying direction from a star position where the clamping device clamps the body from the conveyor to a stop position where the robotic arm deposits the body back onto the conveyor; and wherein the robotic arm is configured to rotate the clamping device and body relative to a rotation axis through the body as the robotic arm moves in the conveying direction to cause the leading and trailing pairs of ties to wrap around the body.

9. The automated production line system of claim 8, wherein the robotic arm comprises a plurality of articulated sections controlled for the robotic arm to lower to the conveyor, clamp the body with the clamping device, raise the body above the conveyor, travel in the conveying direction while rotating the clamping device, and lower the facemask back to the conveyor.

10. The automated production line system of claim 8, wherein the robotic arm moves the body in an arc path from the start position to the stop position.

11. The automated production line system of claim 8, further comprising means for drawing the leading pair of ties below the body as the facemask is conveyed in the conveying direction such that the leading pair of ties wraps under the body.

12. The automated production line system of claim 11, wherein the means for drawing the leading pair of ties comprises a suction device disposed below the conveyor on which the facemasks are conveyed to the wrapping station, the suction device disposed in a gap between a first section of the conveyor and a second section of the conveyor, the body transferred from the first section of the conveyor to the robotic arm and deposited by the robotic arm onto the second section of the conveyor after the leading and trailing pairs of ties have been wrapped around the body.

13. The automated production line system of claim 8, wherein the robotic arm is conveyed in the conveying direction along a track.

14. The automated production line system of claim 13, wherein the robotic arm is driven along the track by a motor and threaded axle engaged with the robotic arm, the motor being reversible to return the robotic arm to the start position.

\* \* \* \* \*